United States Patent
Chuang et al.

(10) Patent No.: US 6,687,399 B1
(45) Date of Patent: Feb. 3, 2004

(54) STEREO SYNCHRONIZING SIGNAL GENERATOR FOR LIQUID CRYSTAL SHUTTER GLASSES

(75) Inventors: Chien-tsung Chuang, Hsichu (TW); Jen-min Yuan, Tai Chung (TW); Kwo-woei Yet, Miao Li (TW)

(73) Assignee: Silicon Integrated Systems Corp. (TW)

(*) Notice: Subject to any disclaimer, the term of this patent is extended or adjusted under 35 U.S.C. 154(b) by 606 days.

(21) Appl. No.: 09/632,496

(22) Filed: Aug. 3, 2000

(51) Int. Cl.[7] ................................................. G06K 9/00
(52) U.S. Cl. .................. 382/154; 382/284; 382/285; 382/287; 348/51; 348/56; 345/419; 345/653
(58) Field of Search ........................... 382/117, 128, 382/154, 206, 207, 209, 218, 219, 278, 285, 286, 291, 293, 294, 295, 151, 208, 287, 305; 345/419, 598, 653, 654, 757, 836, 848, 850, 852; 348/51, 481, 43, 47, 56, 53, 311; 356/12, 16, 17, 22

(56) References Cited

U.S. PATENT DOCUMENTS

| | | | | |
|---|---|---|---|---|
| 5,119,189 A | * | 6/1992 | Iwamoto et al. ............... 348/47 |
| 5,379,369 A | * | 1/1995 | Komma et al. ............... 345/419 |
| 5,684,529 A | * | 11/1997 | Yoshimi et al. ............... 348/43 |
| 5,699,133 A | * | 12/1997 | Furuta ........................ 349/13 |
| 5,786,848 A | * | 7/1998 | Isobe et al. .................... 348/51 |
| 6,031,565 A | * | 2/2000 | Getty et al. .................... 348/56 |
| 6,057,811 A | * | 5/2000 | Edwards ........................ 345/8 |
| 6,188,442 B1 | * | 2/2001 | Narayanaswami .......... 348/564 |
| 6,266,106 B1 | * | 7/2001 | Murata et al. ................ 349/15 |

* cited by examiner

Primary Examiner—Bhavesh M. Mehta
Assistant Examiner—Yosef Kassa
(74) Attorney, Agent, or Firm—Martine & Penilla, LLP

(57) ABSTRACT

A stereo synchronizing signal generator for liquid crystal shutter glasses is provided. The stereo synchronizing signal generator includes a signal generating unit to generate preliminary shuttering signals according to an image vertical synchronizing signals and a start signal. A signal delaying unit is provided to delay the preliminary shuttering signals according to a value, which can be changed by users. Then an output unit is provided to transmit the delayed shuttering signals to the liquid crystal shutter glasses. Due to that the signal generating unit generates a predetermined shuttering signal, such as right eye shuttering signal, at the rise edge of the start signal, the shuttering signals can always match up to the right image. Furthermore, the signal delaying unit can adjust the timing of the shuttering signal according to the value of the register, therefore the shuttering signals can always be synchronized with the image.

10 Claims, 4 Drawing Sheets

STEREO SYNCHRONIZING SIGNAL GENERATOR FOR LIQUID CRYSTAL SHUTTER GLASSES

BACKGROUND OF THE INVENTION

A. Field of the Invention

The present invention relates to a signal generator, more specifically, to a synchronizing signal generator for liquid crystal shutter glasses.

B. Description of the Related Art

For the human visual system, due to the independent visual system for the right eye and the left eye, the image captured by the right eye is different from the one captured by the left eye. Therefore, human can merge the individual images (parallax images) together and obtain a vision with depth perception. That is how the feeling of stereo comes from. Since general image systems do not output left image and right image, independently, viewers just can see plan image without the feeling of stereo. For providing stereo image, such as 3D movies, to viewers, a mechanism of stereoscope and field-sequential stereoscopic display is provided. The field-sequential stereoscopic display outputs a right image and a left image sequentially, and the left eye and the right eye of the stereoscope are shut synchronized with the right image and the left image. If the switching between left and right eyes is fast enough that human eyes can not distinguish the change of switching, then the feeling of stereo is generated. In addition, for generating ideal feeling of stereo, the switching between left and right eyes of the stereoscope should be synchronized with the left image and right image on the screen.

A shutter type of liquid crystal shutter glasses (hereinafter referred as shutter glasses) is useful for 3D stereo viewing. The shutter glasses does not shutter left eye or right eye by any mechanical shuttering, but shutter by alternately electrical signal. FIG. 1 illustrates a field-sequential stereo display with the shuttering states for a shutter glasses. The screen 100 displays in a way following the sequence as left image, right image, left image, . . . , meanwhile the right eye and left eye of the shutter glasses 110 are shut alternately and successively by a synchronizing signal. Therefore, viewers wearing the shutter glasses 110 can see the left image with left eye and see the right image with right eye to get the feeling of stereo.

FIG. 2 shows the timing chart for the shuttering signals of the shutter glasses. For image system, it generates a vertical synchronizing signal VSS for each image frame. A typical shutter glasses generates shuttering signals according to this vertical synchronizing signal. As being shown in FIG. 2, when a left eye image is displayed on the screen 100, the shuttering signal of right eye is at high level, and the right eye of the shutter glasses is shuttered and opaque. At the same time, the shuttering signal of left eye is at low level, and the left eye of the shutter glasses is transparent so that viewer can see the left image. Then, when a right eye image is displayed on the screen 100, the shuttering signal of right eye is at low level, and the right eye of the shutter glasses is transparent so that viewer can see the right image. At the same time, the shuttering signal of left eye is at high level, and the left eye of the shutter glasses is shuttered and opaque. Consequently, by alternately applying shuttering signals to the shutter glasses and displaying individual eye image on the screen 100, the stereo movies can be generated.

However, due to that shuttering signals of prior art is triggered by the vertical synchronization signal only, it is hard to tell whether the current displaying image belongs to left eye or right eye. Therefore, the shuttering signals can not be transmitted properly and in consequence, so that the left eye image and right eye image will be out of sequence. To solve the above problem, the user has to switch the stereo orientation of shutter glasses manually in order to display images synchronously.

Furthermore, due to the effect of different switching speed of the shutter glasses and the different phosphor decay rate of the monitor, the images displayed on the screen and their corresponding switching action of shutter glasses are out of step. It will thus result in eye and brain-strain of the viewer and fail to generate the 3D stereo view. For example, if the switching action is too early, the residual image to the previous eye view is visible to the other eye view; on the other hand, if the switching action is too late, user will see the top portion image on the wrong eye.

SUMMARY OF THE INVENTION

Whereas the above problem has occurred, the main purpose of the present invention is to provide a stereo synchronizing signal generator for shutter glasses, which can properly generate the stereo synchronizing signals.

Another purpose of the present invention is to provide a stereo synchronizing signal generator for shutter glasses, which allows the users to retard or lead the switching timing of the stereo synchronizing signal.

A further purpose of the present invention is to provide a stereo synchronizing signal generator for shutter glasses with different types of interface.

The stereo synchronizing signal generator for shutter glasses according to the present invention includes a signal generating unit for generating the preliminary shuttering signals PSS according to the vertical synchronizing signal and a start signal. A signal delaying unit is provided for delaying the preliminary shuttering signals PSS according to a value in a register. Then an output unit connected to the signal delaying unit for outputting the delayed signals into the shutter glasses.

BRIEF DESCRIPTION OF THE DRAWINGS

These and other objects and advantages of the present invention will become apparent by reference to the following description and accompanying drawings wherein.

DETAIL DESCRIPTION OF THE INVENTION

Figure 1:
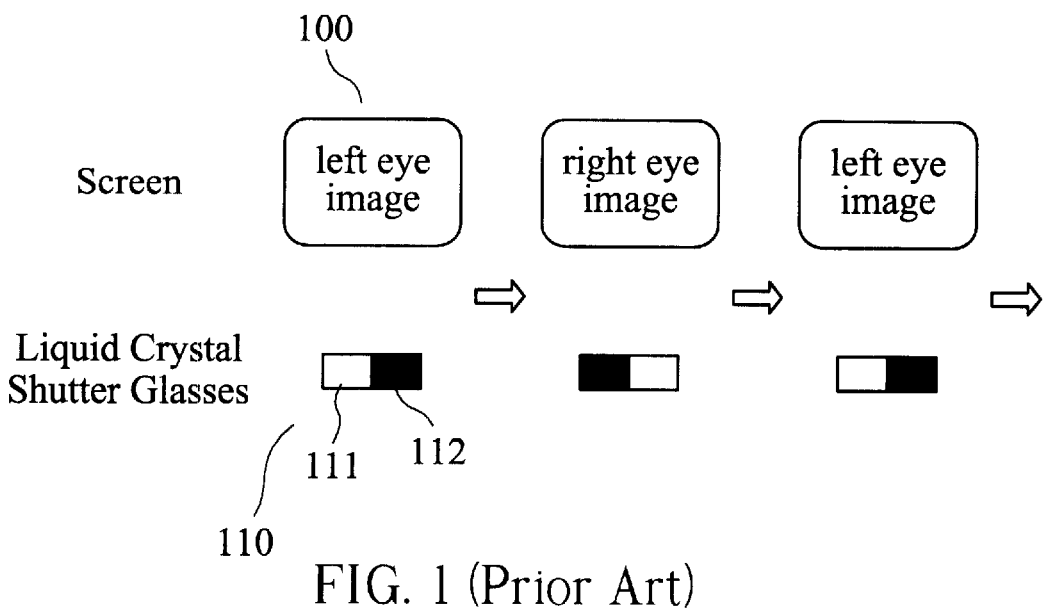
FIG. 1 illustrates a field-sequential stereo display.
Figure 2:
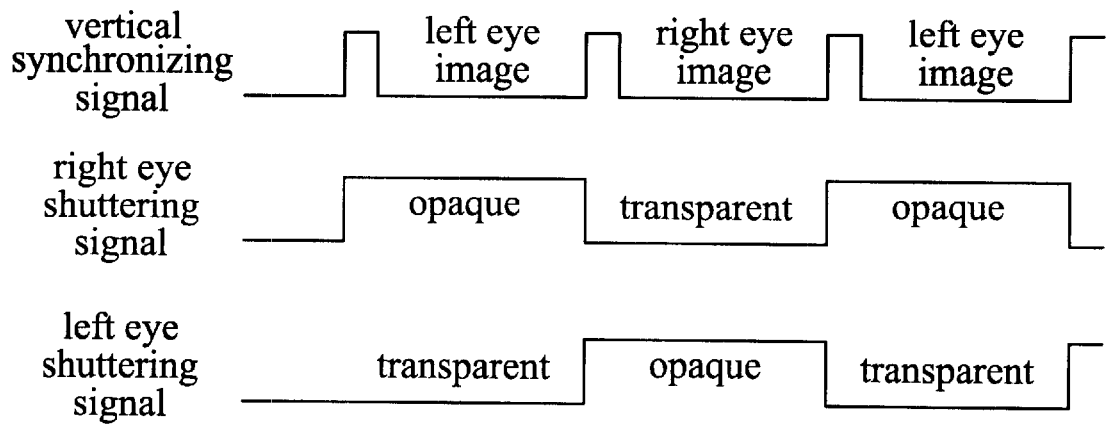
FIG. 2. shows a timing chart of the stereo synchronizing signals of a conventional shutter glasses.
Figure 3:
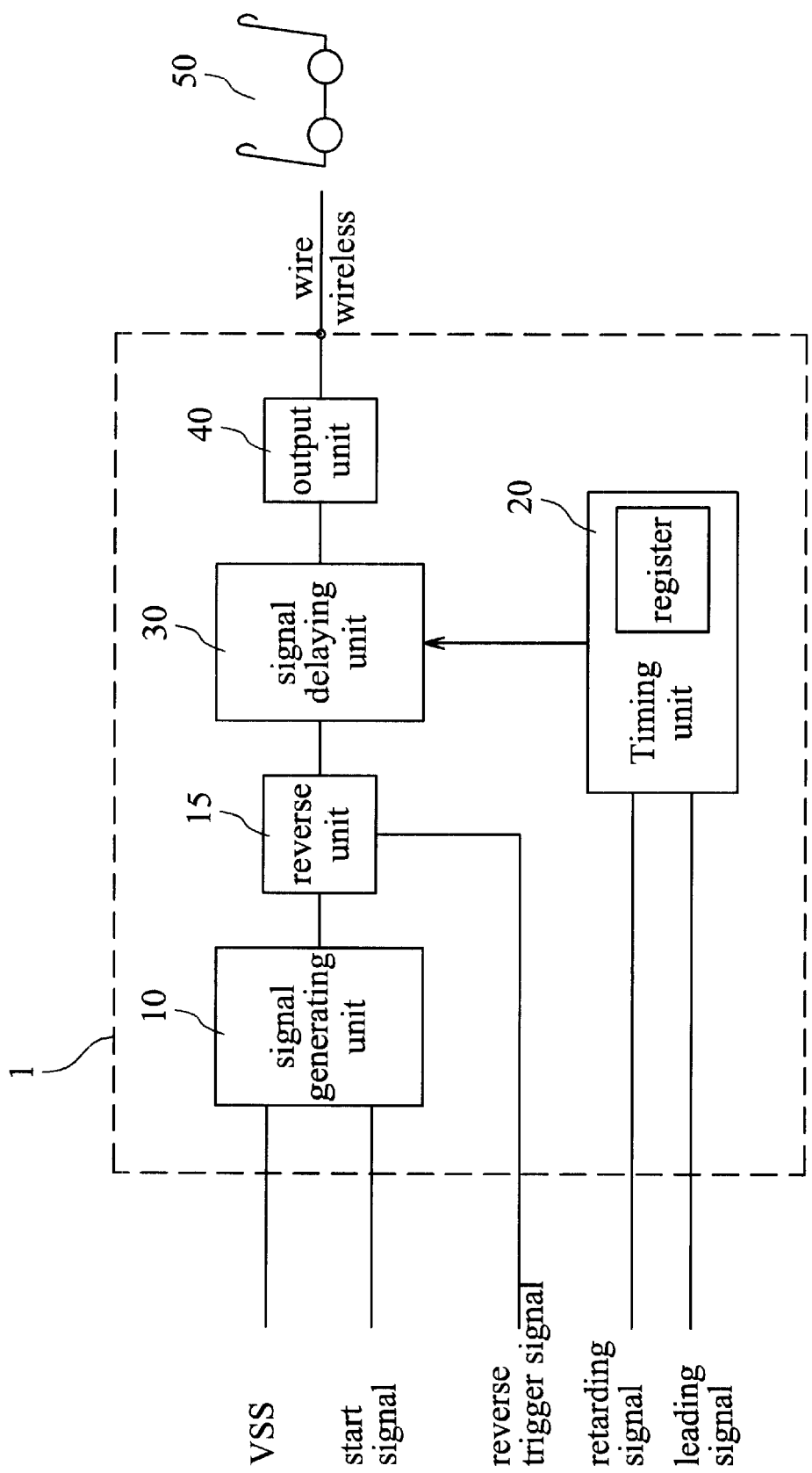
FIG. 3 shows a block diagram of a stereo synchronizing signal generator for shutter glasses according to the present invention.

FIG. 3 shows a block diagram of a stereo synchronizing signal generator for shutter glasses according to the present invention. As shown in FIG. 3, the stereo synchronizing signal generator 1 includes a signal generating unit 10, a timing unit 20, a signal delaying unit 30 connected to the timing unit 20 and the signal generating unit 10 via a reverse unit 15, and an output unit 40 connected to the signal delaying unit 30.

Since the preliminary shuttering signals PSS is generated by the signal generating unit 10 according to the vertical synchronizing signals VSS and a start signal, the preliminary shuttering signals (PSS) are synchronized with the vertical synchronizing signals. Furthermore, due to that the computer system (not shown) outputs the start signal to the stereo synchronizing signal generator 1 when 3D function is actuated, the signal generating unit 10 outputs a predetermined first shuttering signal, such as right eye shuttering signal, at the rise edge of the start signal. The start signal is a signal generated upon a 3D stereo image starts up. With the start signal, the agreement between the left/right eye images and left/right shuttering signals can be achieved. In other words, when the signal generating unit 10 receives the rise edge of the start signal and becomes enabled, it sends a predetermined shuttering signal, such as right eye shuttering signal, while the system displays a left eye image on the screen. Therefore, the shuttering signals can match up to the images.

Due to the different switching speed of the shutter glasses and the different phosphor decay rate of the monitor, the images displayed on the screen will be asynchronous with the switching actions of the corresponding shutter glasses. Therefore, the stereo synchronizing signal generator 1 according to the present invention provides a register to store the delay time to delay the preliminary shuttering signals generated by the signal generating unit 10. The value in the register can either be set by keyboard, or be controlled by the timing unit 20, which receives the retarding signal and leading signal, as shown in FIG. 3. The retarding and the leading signals are controlled by the user of the shutter glasses. In other words, if the user feels that the images are asynchronous with the shutter glasses, the user can control the retarding signal or leading signal to adjust the value of the register, and then to adjust the timing of the shuttering signals.

Figure 4:
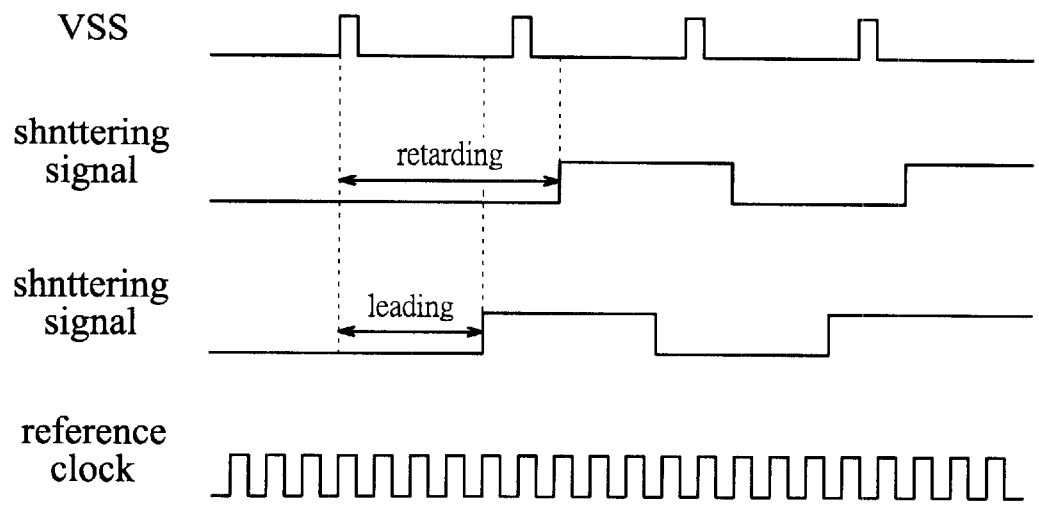
FIG. 4 illustrates the adjustable switching signals of the shutter glasses according to an embodiment of the present invention.

FIG. 4 illustrates the generation of the retarding and leading signals of the shutter glasses according to an embodiment of the present invention. As shown in FIG. 4, when the next image is displayed on the screen and the shutter glasses has not synchronously received the shuttering signal yet, the views will see the top portion image of the next image on the wrong eye. Under this situation, the user of the shutter glasses can control the leading signal to lead the timing of the shuttering signal, that is, to decrease the value in the register. On the other hand, when the liquid crystal glasses receives a shuttering signal before the next image is shown on the screen, the views will see the residual image. To solve this problem, the view can control the retarding signal to retard the timing of the shuttering signal, that is, to increase the value in the register.

The preliminary shuttering signals PSS is delayed by the signal delaying unit 30 according to the value in the register of the timing unit 20. For example, when the value in the register is 10, the preliminary shuttering signals PSS is delayed by 10 cycles of the reference clock. The reference clock can be the horizontal synchronous signal of the image. Therefore, no matter with the difference in feature of the shutter glasses or the difference in display speed of the monitor, the optimized effect of stereo image can be achieved by adjusting the value in the register.

Figure 5:
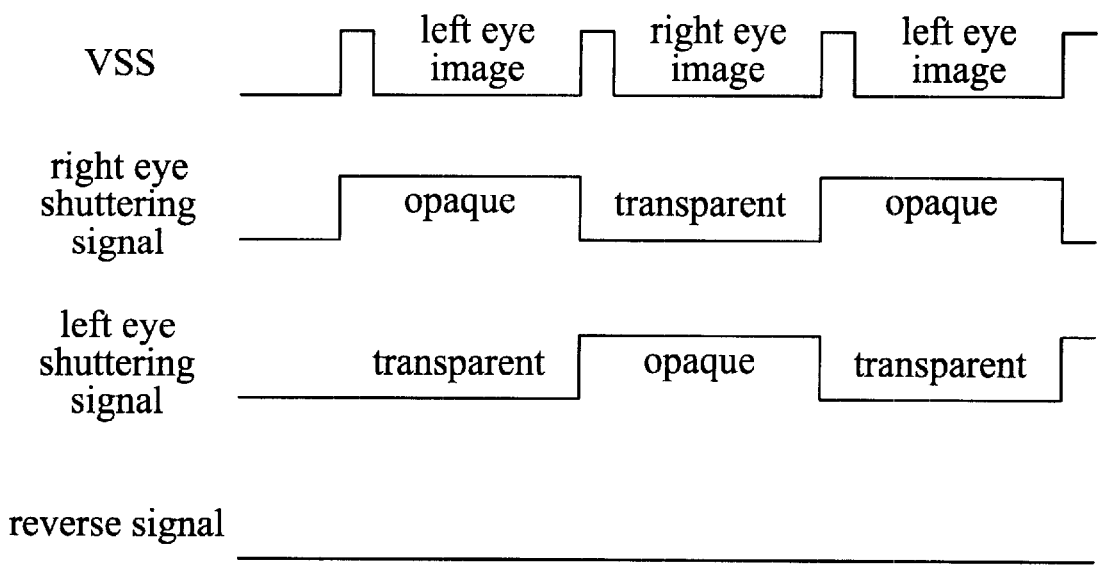
FIG. 5 illustrates the signals of the stereo orientation control according to one embodiment of the present invention.
Figure 6:
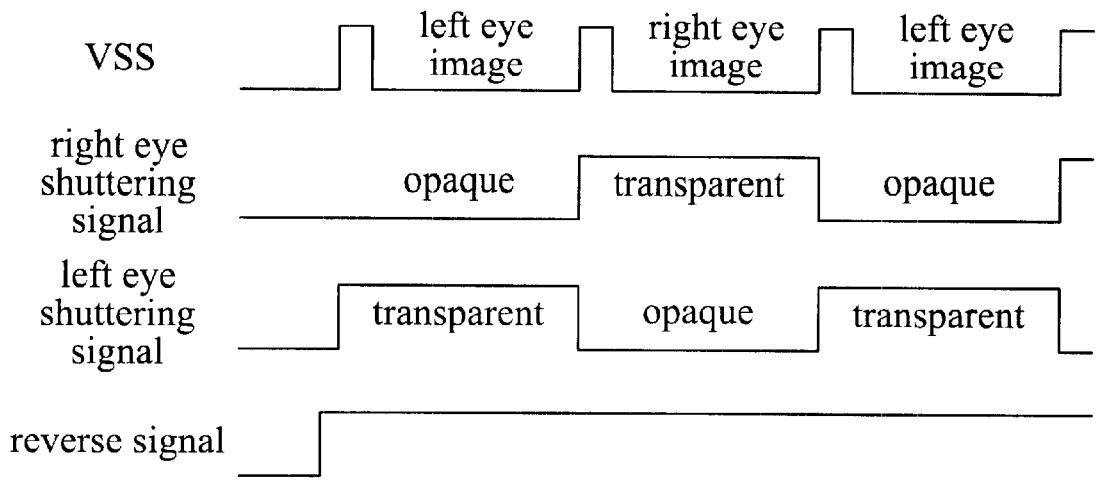
FIG. 6 illustrates the signals of the stereo orientation control with the left and right driving signals mismatched with the left and right images according to another embodiment of the present invention.

The stereo synchronizing signal generator 1 of the present invention further provides a reverse unit 15 to reverse the shuttering signals, as shown in FIG. 3. The reverse unit 15 is connected to the position between the signal generating unit 10 and the signal delaying unit 30, or between the signal delaying unit 30 and output unit 40. When the stereo synchronizing signal generator 1 is activated for the first time by the start signal, the signal generating unit 10 generates the predetermined preliminary shuttering signals PSS according to the vertical synchronizing signals VSS and the start signals. If the image displayed on the screen is synchronized with the switching actions of its corresponding shutter glasses, the reverse signal of the reverse unit 15 will be disabled, as shown in FIG. 5. On the contrary, when the left and right eye images are detected to be out of sequence, the user can enable the reverse signal by entering a signal to trigger the reverse unit 15. As a result, the level of the preliminary shuttering signals (PSS) described above is reversed so as to achieve the effect of synchronizing display, as shown in FIG. 6. With the reverse unit 15, the problem resulted from the out-of-sequence shuttering signals of the left and right eyes due to the shutter glasses of different brands can be resolved. Furthermore, the reverse signals can be stored in the reverse unit 15 for implementing the adjustment whenever the stereo synchronizing signal generator 1 starts up. Therefore, it is not necessary to adjust the reverse signals for the same shutter glasses every time when the stereo synchronizing signal generator 1 starts.

Figure 7:
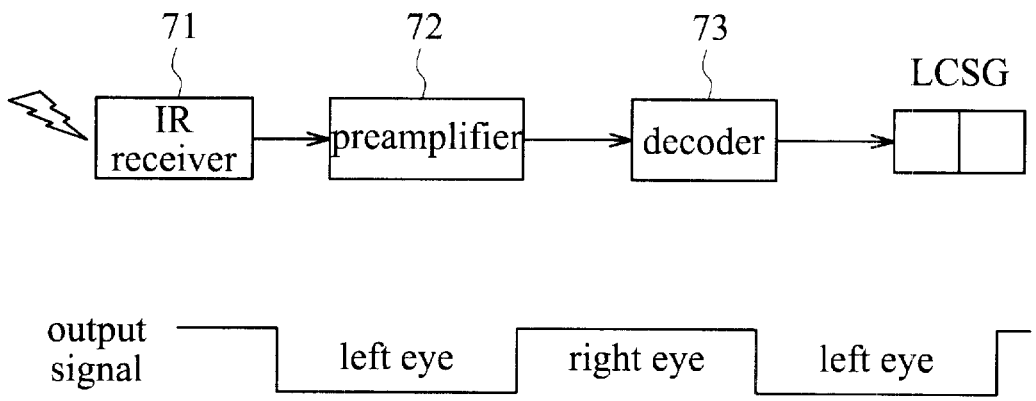
FIG. 7 illustrates an embodiment of the wireless type receiver at remote infrared (IR) shutter glasses.

The output unit 40 is used to output the delayed (synchronized) shuttering signals to the shutter glasses. For different types of shutter glasses, the output unit 40 provides different interfaces for the device of cable type and wireless type (for example, IR and radio). The cable type is to transmit the shuttering signals to the shutter glasses via a physical cable, meanwhile the wireless type is to transmit the shuttering signals to the shutter glasses via IR or radio. FIG. 7 illustrates an embodiment of a wireless type receiver at remote IR shutter glasses. In the present embodiment, the output unit 40 includes an IR output module (not shown) and thereby converts the delayed shuttering signals into IR signals. The shutter glasses is configured with an IR receiver 71 to receive IR signals from the output unit 40, then transmitting the signals to a preamplifier 72 at the IR shutter glasses. Next, the output signals of the receiver is converted into control signals by the stereo synchronizing signal decoder 73 to manage the switching actions of the shutter glasses.

Of course, the stereo synchronizing signal decoder 73 provides a plurality of functions for decoding, such as defining the different code or using the specific frequency signal to represent the different state of the shuttering signals. According to the former example, if the opaque state of the left eye shutter is defined as "10101111", the decoder 73 translates "10101111" to "1" and applies a voltage to the left shutter glasses. According to the latter example, by transmitting a specific frequency signal (such as 38 KHz), the preamplifier 72 can translate the input signals to the left or right driving signals ("1" or "0") automatically without a decoder. Therefore, the synchronizing signal generator 1 provides more flexibility for different types of shutter glasses. Users can select a mode, thereby the stereo synchronizing signal generator 1 can translate the delayed shuttering signals to available signals.

The stereo synchronizing signal generator of shutter glasses according to the present invention provides the function for controlling the timing of shuttering signals, that is, to change the value in the register by the retarding signal and leading signal. Therefore, the stereo synchronizing signal generator can match up to different types of shutter glasses.

While the stereo synchronizing signal generator for shutter glasses according to this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. For example, though the foregoing embodiment is made up of signal generating unit, timing unit, signal delaying unit, and output unit, all above functions can be combined in the same unit. It is therefore intended that the appended claims encompass any such modifications or embodiments.

What is claimed is:

1. An apparatus of generating stereo synchronizing signal for liquid crystal shutter glasses, comprising:
   a signal generating unit for generating preliminary shuttering signals according to an image vertical synchronizing signals and a start signal;
   a signal delaying unit connected to said signal generating unit for delaying said preliminary shuttering signals and outputting delayed shuttering signals;
   an output unit connected to said signal delaying unit for transmitting the delayed shuttering signals to the liquid crystal shutter glasses;
   a register for storing a value to control the delay timing of said signal delaying unit; and
   a timing unit for receiving a retarding signal and a leading signal so as to change the value in said register.

2. The apparatus as claimed in claim 1 further comprising a signal reverse unit connected between the signal generating unit and said signal delaying unit for reversing the preliminary shuttering signals according to a reverse signal.

3. The apparatus as claimed in claim 1 further comprising a signal reverse unit connected between the signal delaying unit and output unit for reversing the delayed shuttering signal according to a reverse signal.

4. The apparatus as claimed in claim 1, wherein said output unit comprises an IR transmitter to convert the delayed shuttering signals into IR signals.

5. The apparatus as claimed in claim 4, wherein said IR transmitter transmits the IR signals with two different frequencies to indicate the different levels of said delayed shuttering signals.

6. An apparatus of generating stereo synchronizing signal for liquid crystal shutter glasses, comprising:
   a signal generating unit for generating preliminary shuttering signals according to an image vertical synchronizing signal and a start signal;
   a signal delaying unit connected to said signal generating unit for delaying said preliminary shuttering signals and outputting delayed shuttering signals;
   an output unit connected to said signal delaying unit for transmitting the delayed shuttering signals to the liquid crystal shutter glasses;
   a register for storing a value to control the delay timing of said signal delaying unit; and
   a human-to-machine interface for inputting a retarding signal and a leading signal into the register so as to change the value in said register.

7. The apparatus as claimed in claim 6 further comprising a signal reverse unit connected between the signal generating unit and said signal delaying unit for reversing the preliminary shuttering signals according to a reverse signal.

8. The apparatus as claimed in claim 6 further comprising a signal reverse unit connected between the signal delaying unit and output unit for reversing the delayed shuttering signal according to a reverse signal.

9. The apparatus as claimed in claim 6, wherein said output unit comprises an IR transmitter to convert the delayed shuttering signals into IR signals.

10. The apparatus as claimed in claim 9, wherein said IR transmitter transmits the IR signals with two different frequencies to indicate the different levels of said delayed shuttering signals.

* * * * *